United States Patent
Malek

(10) Patent No.: US 6,494,063 B1
(45) Date of Patent: Dec. 17, 2002

(54) APPARATUS FOR PUSHING HOLLOW GLASS ARTICLES ONTO A CONVEYOR BELT

(75) Inventor: Raimund Malek, Auetal (DE)

(73) Assignee: Hermann Heye, Obernkirchen (DE)

( * ) Notice: Subject to any disclaimer, the term of this patent is extended or adjusted under 35 U.S.C. 154(b) by 0 days.

(21) Appl. No.: 09/447,667

(22) Filed: Nov. 23, 1999

(30) Foreign Application Priority Data

Feb. 6, 1999 (DE) .................... 299 02 149 U

(51) Int. Cl.⁷ .................... C03B 9/04; C03B 9/44
(52) U.S. Cl. .................... 65/260; 65/239; 65/241; 198/370.02; 198/370.07; 198/370.11; 198/370.12; 198/438; 198/468.1; 198/493; 294/64.1; 294/64.2; 294/64.3; 414/744.1; 414/744.6; 414/752
(58) Field of Search .................... 65/239, 241, 260; 198/37.02, 370.07, 370.12, 370.11, 438, 468.1, 493; 294/64.1, 64.2, 64.3; 414/744.1, 744.6, 752

(56) References Cited

U.S. PATENT DOCUMENTS

| | | | |
|---|---|---|---|
| 3,249,200 A | 5/1966 | Rowe | 198/24 |
| 3,249,201 A | 5/1966 | Rydlewicz | 198/24 |
| 3,398,823 A | 8/1968 | Hollenton | 198/22 |
| 3,400,802 A | 9/1968 | Rowe | 198/20 |
| 3,559,537 A | 2/1971 | Faure | 91/462 |
| 3,595,365 A | 7/1971 | Faure | 198/24 |
| 4,162,911 A | 7/1979 | Mallory | 65/229 |
| 4,203,752 A | 5/1980 | Becker et al. | 65/163 |
| 4,222,480 A | 9/1980 | Perry | 198/490 |
| 4,340,413 A | 7/1982 | Rowland | 65/375 |
| 4,462,519 A | 7/1984 | Parkell et al. | 198/490 |
| 4,466,532 A | 8/1984 | Minneman et al. | 198/490 |
| 4,502,721 A | 3/1985 | Savin-Czeizler et al. | 294/1.1 |
| 4,528,018 A | 7/1985 | Schneider et al. | 65/260 |
| 4,771,878 A | 9/1988 | Braithwaite et al. | 198/468.01 |
| 4,927,444 A | 5/1990 | Voisine | 65/323 |
| 5,037,466 A | 8/1991 | Voisine et al. | 658/260 |
| 5,056,648 A | 10/1991 | Huber et al. | 198/468.01 |
| 5,061,309 A | 10/1991 | Mungovan et al. | 65/260 |
| 5,125,499 A | 6/1992 | Saathoff et al. | 198/468.01 |
| 5,181,949 A | 1/1993 | Egloff | 65/375 |
| 5,429,651 A | 7/1995 | Bolin | 65/241 |
| 5,733,354 A | 3/1998 | Voisine et al. | 65/260 |
| 5,988,355 A | 11/1999 | Merour | 198/493 |
| 6,062,845 A | 5/2000 | Conaway et al. | 425/444 |

FOREIGN PATENT DOCUMENTS

| | | | |
|---|---|---|---|
| DE | 2746675 | 10/1979 | C03B/9/44 |
| DE | 195 31 053 A1 | 2/1996 | C03B/9/453 |
| DE | 69205793 T2 | 6/1996 | F15B/15/28 |
| DE | 19800080 C1 | 1/1998 | C03B/9/453 |
| DE | 29902149 U1 | 9/1999 | B65G/47/74 |
| EP | 0 416 779 A1 | 3/1991 | C03B/9/453 |
| EP | 0 536926 B1 | 11/1995 | F15B/15/28 |
| WO | WO 97/26220 | 7/1997 | C03B/9/453 |

OTHER PUBLICATIONS

U.S. appln. No. 09/718,581, filed Nov. 22, 2000, entitled Device and Method of Transferring Glass Objects (Bogert et al).

*Primary Examiner*—Michael Colaianni
(74) *Attorney, Agent, or Firm*—Synnestvedt & Lechner LLP

(57) ABSTRACT

The apparatus serves for pushing at least one of two hollow glass articles from a dead plate of a glass forming machine onto a conveyor belt. A pusher serves for this purpose, and includes a base portion and, for each glass article which is to be pushed, at least one thrust finger extending transversely to the base portion. Each thrust finger defines with the base portion a pocket for receiving the glass article. A nozzle is arranged in the region of a corner of the associated pocket. From each nozzle compressed air can be blown such that a pressure below atmospheric pressure which draws the glass article into the pocket is created between the pusher and the glass article. The compressed air is blown from the corner out between the base portion and the glass article.

28 Claims, 4 Drawing Sheets

APPARATUS FOR PUSHING HOLLOW GLASS ARTICLES ONTO A CONVEYOR BELT

FIELD OF THE INVENTION

The invention relates to an apparatus for pushing at least one hollow glass article from a dead plate of a glass forming machine along a curved path onto a conveyor belt.

BACKGROUND OF THE INVENTION

In one known apparatus of this type, disclosed in US 5 527 372 A, a stream of air is directed eccentrically against the heel of a bottle, so that the greater part of the airflow passes around the bottle in the clockwise direction (FIG. 4) through the corner of the pocket of the pusher, while the lesser part of the airflow passes around the bottle in the anticlockwise direction. The discharge opening for the stream of compressed air is located at the bottom of the free end of each finger of the pusher. A thrust pad on the finger ends above the discharge opening. Nevertheless, the compressed air exiting from the discharge opening is deflected upwards between the thrust pad and the bottle. This has the result that the bottle in the known apparatus is not permanently in contact either with the thrust pad or with the face pad of the side wall. The positioning of the bottle on the conveyor belt is correspondingly uncertain. Furthermore, the consumption of air is comparatively large, since compressed air flows all around the bottle. The path of the compressed air to reach the free end of the finger is comparatively long and convoluted. This results in corresponding losses of pressure.

From published international application number WO97/26220 A1 are known a series of embodiments per se, which all have to do with the suction effect of a stream of compressed air exiting from a nozzle. In FIGS. 1 and 3 reference is made to circular nozzles, although in relation to the nozzle in FIG. 3 one could alternatively use a slot nozzle, similar to the slot nozzle in FIG. 14.

The principle is to be understood from FIGS. 14 to 17 of this publication. The compressed air is supplied to a main wall of the pusher through a passage and exits from a nozzle slot, as a rule at an angle to the main plane of the main wall. This angled exit has the result that the air stream makes contact with the face pad, as is shown particularly clearly in FIG. 15. The publication describes this as the so-called Coanda effect (see page 10, lines 24 to 29). In each case, approximately from the horizontal centre of the main wall of each pocket air is blasted in the direction of that corner of the pocket in which the bottle is to stand. This jetting of air into the bottle corners has the result that turbulence and build-up of air would arise there if one did not provide a suction aperture in the associated finger, as shown in FIG. 14.

SUMMARY AND OBJECTS OF THE INVENTION

It is the object of the invention to reduce the structural cost and the consumption of compressed air. However, the apparatus should also prevent the glass articles from being released unintentionally by the pusher at high angular velocities (high conveyor velocities or large track radii of the outer glass articles in multiple mold machines), before the pushed glass article has reached its final position on the conveyor belt. Such a premature release of the glass article from the desired position would lead to transportation errors.

This object is achieved by using a pusher which comprises a base portion and, for each glass article to be pushed, at least one thrust finger extending transversely from the base portion, wherein each thrust finger with the base portion defines a pocket to receive the glass article, the pusher including a nozzle for each pocket, and wherein from each nozzle compressed air can be blown such that a pressure below atmospheric pressure which draws the glass article into the pocket is created between the pusher and the glass article. Each nozzle is arranged in the region of a corner of the associated pocket such that the compressed air can be blown from the corner out between the base portion and the glass article. The apparatus is particularly suitable for the simultaneous pushing of two or more glass articles which have been manufactured in particular in a section of an I.S. (individual section) glass forming machine. The conveyor belt runs along all sections of the I.S. glass forming machine. Preferably, jets with a bore of about 2 mm diameter and compressed air at about 2.0 to 2.5 bar are used. It is recommended that the compressed air should be supplied in a timed manner, in other words only during those parts of the pushing cycle in which otherwise there would be the danger that the glass article would be freed in an undesired manner from its pocket of the pusher. The arrangement of the jet in the region of the corner of the associated pocket of the pusher has the advantage that the compressed air is blown outwards from this corner. Therefore, in the corner, this cannot lead to turbulence and a build-up of air. Sucking the compressed air from the corner is therefore superfluous. Additionally, for a positionally accurate delivery of the glass article onto the conveyor belt, the moment in time that the compressed air is switched off is no longer critical. The consumption of air is reduced, since the compressed air no longer has to flow around the glass article but only now flows through between the base portion and the glass article.

Because the nozzle is mounted on the base portion, there is a particularly short supply path for the compressed air up to the jet.

Because the nozzle can be mounted at different heights on the pusher, one may choose the optimum height level for the jet for any axial length of the glass article.

Because the compressed air is blown at an angle downwards from each nozzle one achieves an optimum utilisation of the compressed air for the achievement of the desired suction effect between the base portion and the glass article.

The fact that compressed air can be blown out from each nozzle at least approximately parallel to the base portion leads to a particularly low consumption of compressed air with good suction effect.

The compressed air can be blown from each nozzle in the direction of a cylindrical part of the glass article which has a maximum transverse dimension, thus, a gap of greater or lesser dimensions is formed between the base portion and the glass article, the size of which gap is very easily controllable however. The gap can in each case have an influence on the final positioning of the glass article on the conveyor belt, transversely to the longitudinal axis of the conveyor belt. The advantage of blowing against the cylindrical part of the glass article lies in a particularly good utilisation of the compressed air to achieve a sufficient suction effect.

During the pushing, the glass article is in contact with at least one thrust finger, which leads to a defined position of the glass article in the longitudinal direction of the conveyor belt.

The base portion includes a carrier rail having a horizontal longitudinal axis allowing supply channels that are arranged to carry compressed air in the carrier rail. The supply channels for each thrust finger each include an upper cross-passage and a lower cross-passage issuing respectively at an upper contact surface and at a lower contact surface of the carrier rail. Depending upon the desired height of the nozzle, a coupling member carrying the nozzle can be connected in a gas-tight manner either with the upper contact surface or with the lower contact surface. In each coupling member there is provided a connecting passage creating a permanent connection between the associated cross-passage and the nozzle. In this manner it is possible to achieve a very effective and flexible supplying of the jets with compressed air.

At least one thrust finger of each pocket is mounted on the associated coupling member, thus the thrust fingers participate in any possible setting movements of the coupling member. By virtue of this, a separate adjustment of the thrust fingers is superfluous.

Because each coupling member can be adjusted relative to the carrier rail in the directions of the longitudinal axis of the carrier rail it is possible to adjust the thrust fingers of adjacent pockets to match the spacing of the longitudinal axes of adjacent glass articles from one another.

These and further features and advantages of the invention will now be described in more detail with reference to a number of embodiments which are illustrated in the drawings.

DETAILED DESCRIPTION OF PREFERRED EMBODIMENTS

Figure 1:
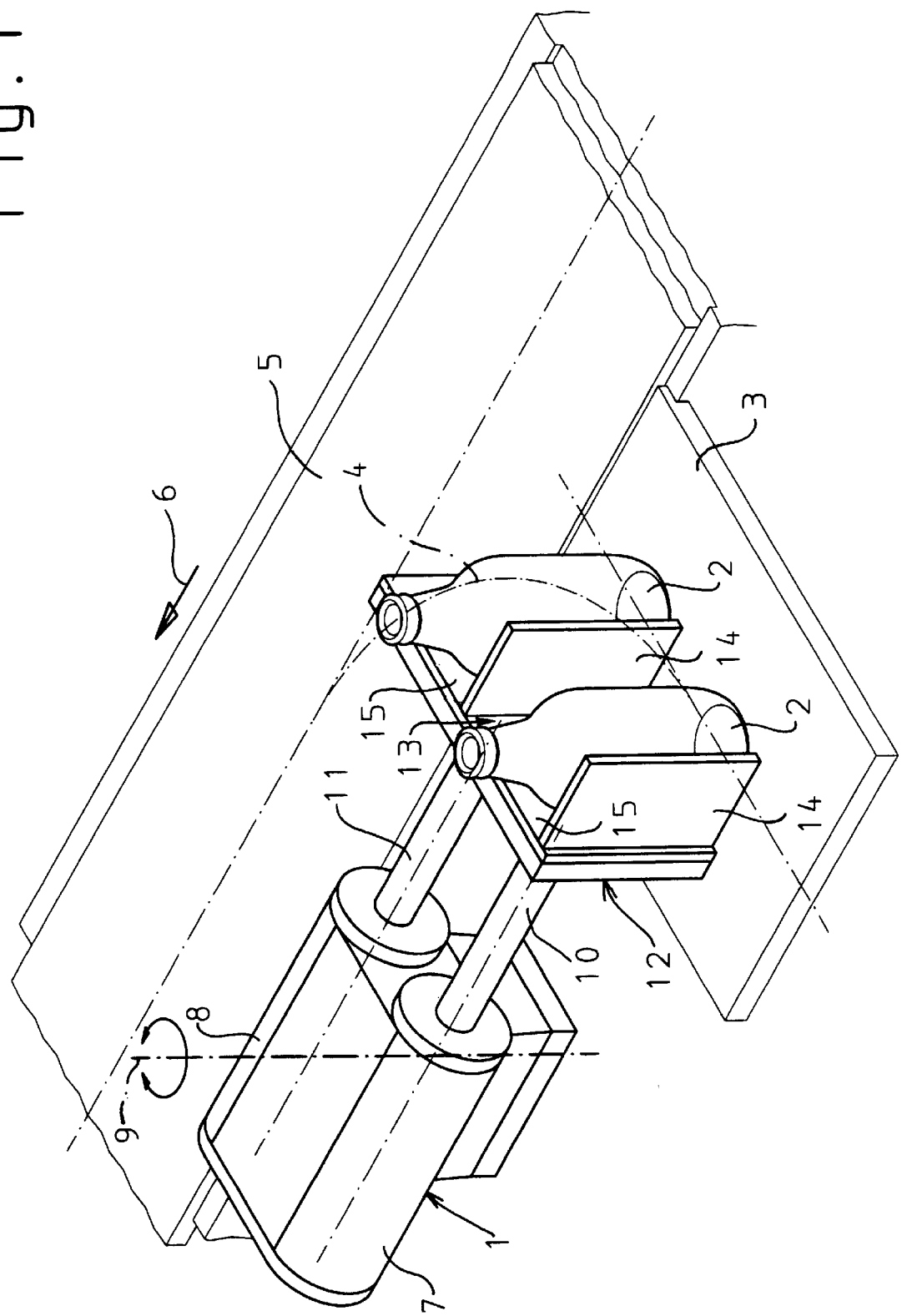
FIG. 1 is a schematic perspective view of a pusher mechanism.

FIG. 1 shows a mechanism 1 for the simultaneous pushing of two hollow glass articles 2 from a dead plate 3 of a glass forming machine, which is not shown in more detail, along a curved path 4 on to a conveyor belt 5. The conveyor belt 5 runs in a manner known per se at constant velocity in the direction of arrow 6 and receives at intervals, in succession, the glass articles 2 of a plurality of sections of an I.S. glass forming machine.

The mechanism 1 comprises two parallel, horizontally arranged piston-cylinder units 7 and 8 which are pivotable back and forth about a vertical axis 9 during a pushing cycle. A pusher 12 is fixed to the piston rods 10 and 11 of the piston-cylinder units 7, 8. The pusher 12 comprises a base portion 13 which extends transversely to the piston rods 10, 11 and, for each glass article 2 which is to be pushed, a thrust finger 14 which extends perpendicular to the base portion 13. Each thrust finger 14 defines with the base portion 13 a pocket 15 for receiving the associated glass article 2.

The piston rods 10, 11 are extended with the pusher 12 until they have reached the pushing position shown in FIG. 1. Next, the finished glass articles 2, 2 are set down on the dead plate 3. Then, the mechanism 1 is pivoted in the anticlockwise direction about the vertical axis 9 until the glass articles 2, 2 have taken up their positions on the conveyor belt 5. At this instant the piston rods 10, 11 are retracted again and the mechanism 1 pivots back about the vertical axis 9 into its starting position.

Figure 2:
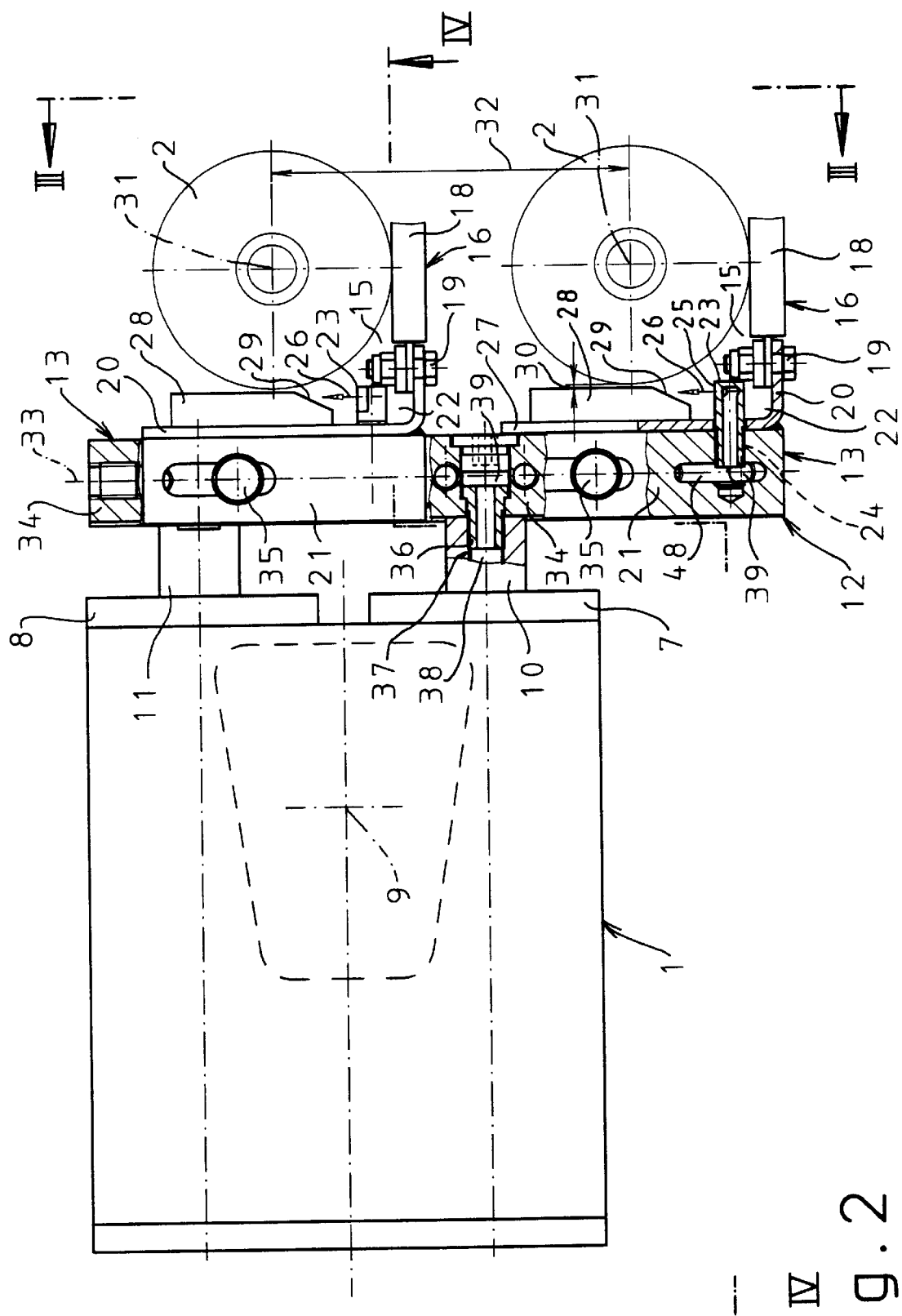
FIG. 2 is a plan view, partly in section, of a portion of a pusher mechanism.
Figure 3:
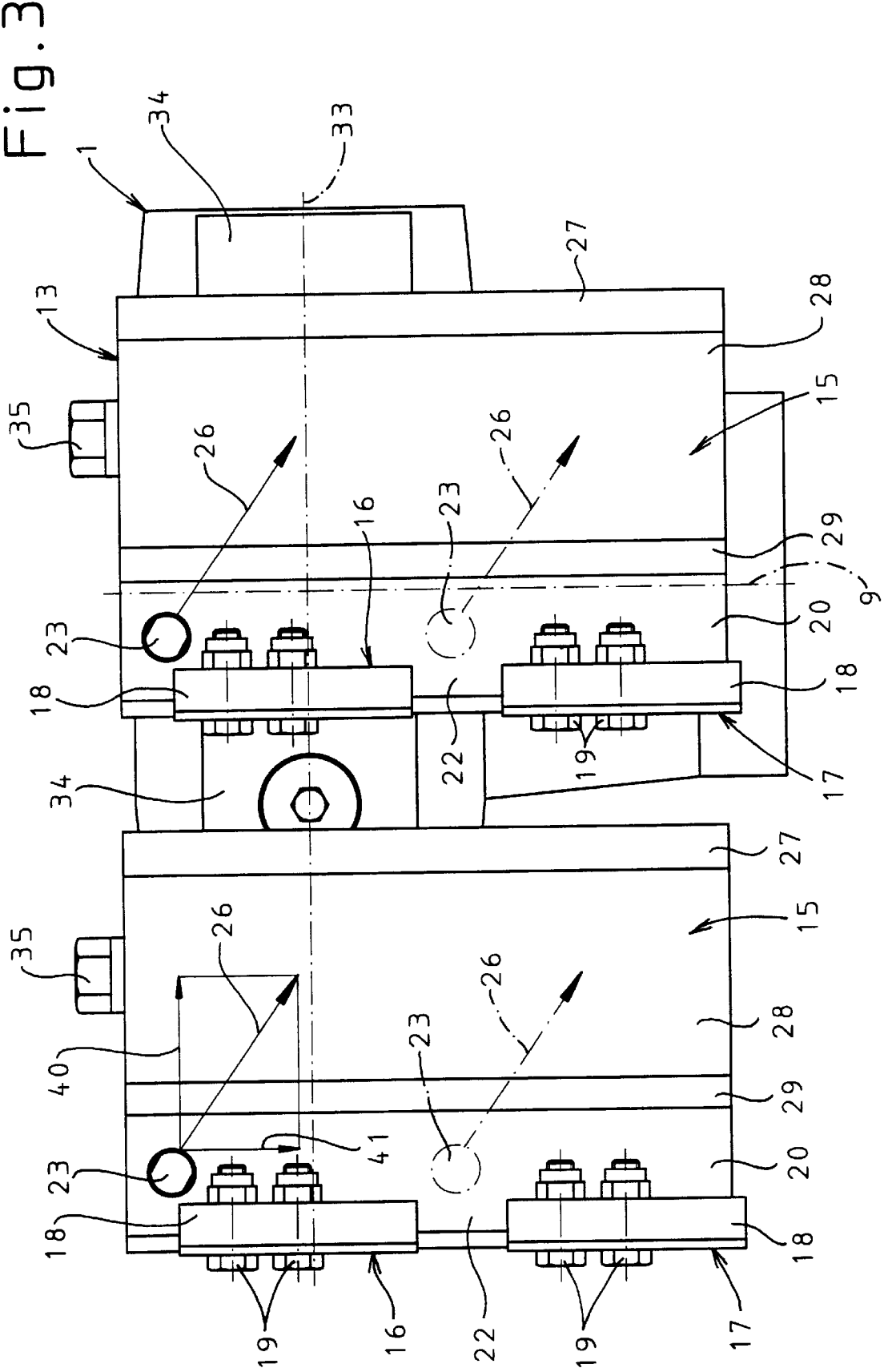
FIG. 3 is the view taken along the line III—III in FIG. 2.

In the embodiment shown in FIG. 2 the pusher 12 again comprises two pockets 15, 15. Basically, the pusher 12 can consist of only one such pocket 15, two pockets 15 or more than two such pockets 15. In the so-called triple gob process, in which three glass articles 2 are made simultaneously in each section of the I.S. glass forming machine, the pusher 12 would accordingly have three pockets 15. Each of these pockets 15 is defined, as shown in FIG. 2, by an upper thrust finger 16 and, as shown in FIG. 3, by an additional lower thrust finger 17. Each thrust finger 16, 17 is provided with a thrust pad 18. Each thrust pad 18 consists in a manner known per se of a material which is able to be careful with the hot glass articles 2 as much as possible. This is important since during the pushing of the glass articles 2 in the manner indicated in FIG. 2 they are in contact with the thrust pads 18.

Each thrust finger 16, 17 is fixed by two screws 19 to an angle bracket 20 which extends downwards from the top. This bracket is for its part welded to a coupling member 21.

In the region of a corner 22 of each pocket 15 there is arranged a nozzle 23 which, as shown in FIG. 2, is pushed through a bore in the angle bracket 20 and is screwed into a threaded bore 24 of the coupling member 21. Compressed air is blown from a nozzle bore 25 of the nozzle 23 in the direction of an arrow 26 parallel to the base portion 13 out from the associated corner 22 and at an angle downwards (FIG. 3). The compressed air need not necessarily be blown at an angle downwards. In many cases a horizontal jetting of the air may be sufficient.

One limb 27 of the angle bracket 20 extending parallel to the base portion 13 is provided over its full height with a face pad 28 which can be made from the same material as the thrust pads 18. Each face pad 28 has a chamfer 29 down its side which faces the nozzle 23, with the chamfer extending from the top to the bottom. The chamfer 29 forms with the oppositely disposed wall of the glass article 22 a funnel so to speak for the compressed air 26. By means of the compressed air there is created a gap 30 between the face pad 28 and the glass article 2, the size of which depends upon the pressure and the volume of the compressed air 26 and is therefore adjustable. The compressed air 26 produces a pressure below atmospheric pressure in the space between the face pad 28 and the glass article 2, which sucks the glass article 2 in the direction towards the face pad 28. In this way, the glass article 2 is held in the pocket 15 during the pushing process. At the end of the pushing process the compressed air 26 can be switched off and remain switched off until a new pushing cycle begins.

The glass articles 2 each have a longitudinal axis 31. The spacing 32 of the longitudinal axes 31 of adjacent glass articles 2 on the dead plate 3 is determined by the structural data of the associated glass forming machine. Normally, this spacing 32 is also maintained on the conveyor belt 5 (FIG. 1). This means that the linear thrust fingers 14, 16, 17 must be set at the spacing 32. This can be accomplished in accordance with the invention quickly and reliably by virtue of the fact that each coupling member 21 is adjustable in the directions of a longitudinal axis 33 of a horizontal carrier rail 34 and relative to the carrier rail 34. The respective adjustment is maintained by a fixing screw 35. The carrier rail 34 is screwed to the free ends of the piston rods 10, 11. This is effected in respect of the piston rod 10 in FIG. 2 by a screw connection piece 36 which has a head engaging in a retaining bore of the carrier rail 34 and has a threaded end engaging in a threaded bore 37 of a longitudinal bore 38 of the piston rod 10 which is supplied with compressed air. The compressed air passes from the longitudinal bore 38 through the screw connection piece 36 into supply channels 39 of the carrier rail 34. The supply channels 39 feed the nozzles 23 with the compressed air 26 in the manner apparent from FIG. 2. The supply channels 39 for both coupling members 21 can, according to FIG. 2, be supplied with compressed air in common from the longitudinal bore 38 of the piston rod 10.

From FIG. 3 it can be seen that in this embodiment each compressed air stream 26 is inclined at an angle downwards and has a horizontal component 40 as well as a vertical, downwardly directed component 41. Thus, the compressed air 26 is blown outwards and downwards at an angle from the respective corners 22.

Figure 4:
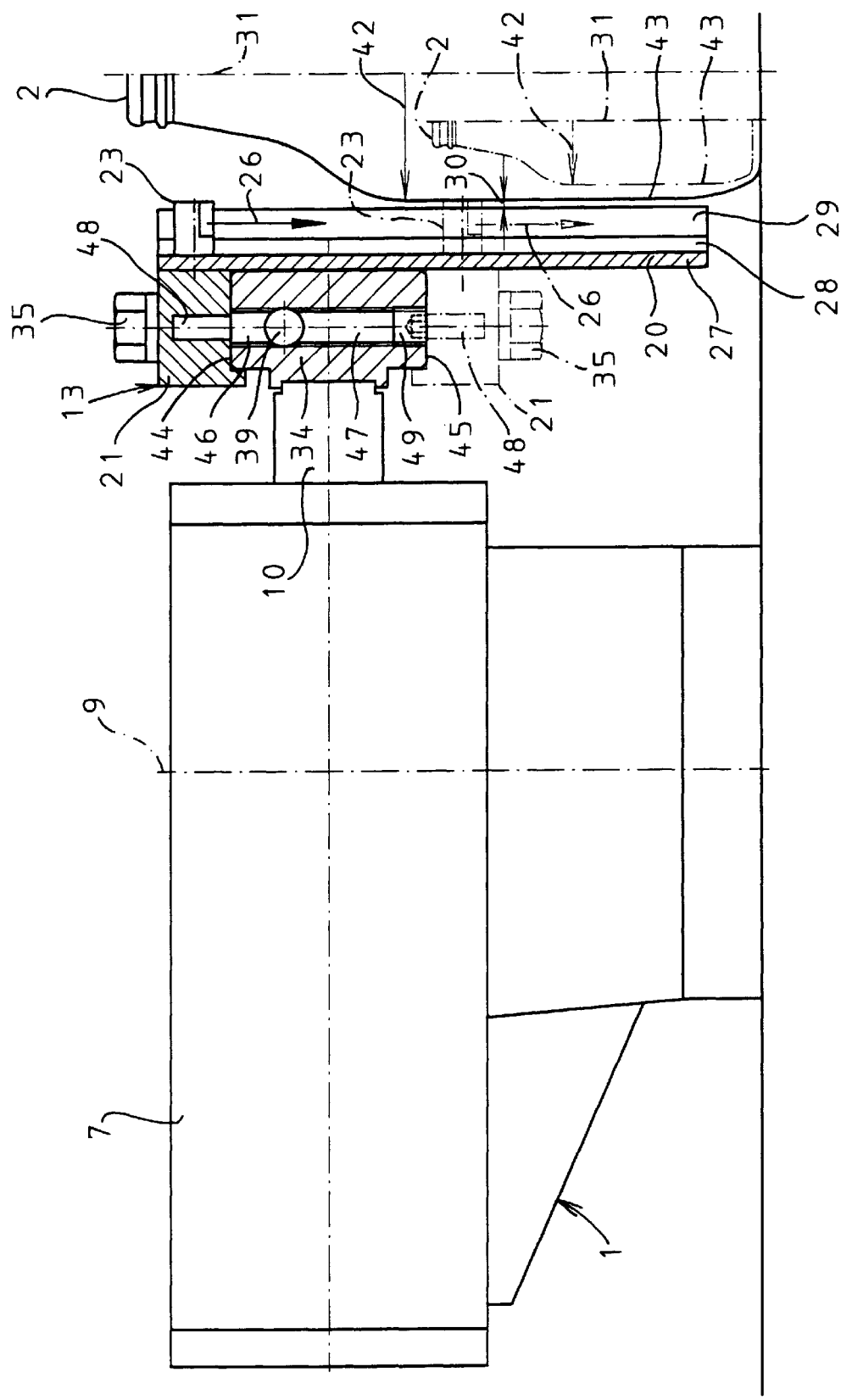
FIG. 4 is the view, partly in section, taken along the line IV—IV in FIG. 2.

In FIG. 3 the two upper compressed air streams 26 are indicated by solid line arrows. The positioning of the associated nozzles 23 corresponds to the solid line representation in FIG. 4 and is used for the pushing of comparatively tall glass articles 2, one of which is indicated in FIG. 4 by a solid outline. This tall glass article 2 is blasted with compressed air from the nozzle 23 which is mounted at the top in the angle bracket 20 such that the compressed air flows in the direction of a cylindrical part 43 of the glass article 2 which has a maximum transverse dimension 42. In this way, the aforementioned gap 30 is formed between the face pad 28 and the cylindrical part 43. For these tall glass articles 2, two thrust fingers 16, 17 mounted spaced one above the other are used in each pocket 15.

In FIGS. 3 and 4 the situation for shorter glass articles 2 is also indicated in chain-dotted lines. Here, the nozzle 23, as can be seen from FIG. 3, is mounted approximately at the mid-height level of the angle bracket 20, and the compressed air stream 26 is again directed at an angle downwards, out from the pocket 22 and essentially parallel to the base portion 13. For this operational situation with comparatively short glass articles 2 one can remove the upper thrust fingers 16.

As shown in FIG. 4 the carrier rail 34 has an upper contact surface 44 and a lower contact surface 45. From the supply channels 39 there extends, for each thrust finger 14, 16, 17, an upper cross-passage 46 up to the upper contact surface 44 and a lower cross-passage 47 down to the lower contact surface 45. With the comparatively tall glass articles 2 illustrated in solid outline, the coupling member 21, according to FIG. 4, is mounted on the upper contact surface 44 and has a connecting passage 48 formed as a longitudinal slot, independently of its longitudinal setting, in permanent communication with the upper cross-passage 46. FIG. 2 illustrates how each connecting passage 48 for its part is in permanent communication with the associated nozzle 23.

If on the other hand the comparatively short glass articles 2 indicated in FIG. 4 by chain-dotted lines are to be pushed, a blind stop 49 is unscrewed from a lower threaded bore of the lower cross-passage and is screwed into a correspondingly threaded bore at the top in the upper cross-passage 46, after the coupling member 21 has been removed from the upper contact surface 44. Then, a coupling member 21 shown in chain-dotted lines in FIG. 4 is mounted on the lower contact surface 45 so that its connecting passage 48 is in permanent communication with the lower cross-passage 47. The nozzle 23 shown in chain-dotted lines in FIG. 4 then provides the lower operational setting for the short glass articles 2 which is also shown in chain-dotted lines in FIG. 3. The angle bracket 20 can be correspondingly shortened and can begin first at the level of the lower contact surface 45 and extend downwardly from there. The angle bracket 20 then carries only the one lower thrust finger 17 as shown in FIG. 3.

What is claimed is:

1. An apparatus for pushing at least one hollow glass article from a dead plate of a glass forming machine along a curved path onto a conveyor, said apparatus comprising:
    a pusher having a base portion and for each glass article at least one thrust finger extending transversely relative to said base portion, said base portion and said thrust finger defining a pocket, said pocket having a corner region to receive said glass article; and
    a nozzle arranged substantially in said corner region of said pocket and configured to blow compressed air away from said corner region between said glass article and said base portion thereby creating a region of pressure below atmospheric pressure between said glass article and said base portion which can draw said glass article into said pocket.

2. An apparatus according to claim 1 wherein said nozzle is mounted on said base portion and oriented to direct compressed air away from said corner region.

3. An apparatus according to claim 1, wherein said nozzle is positionable at different heights on said pusher depending on the height of said glass article.

4. An apparatus according to claim 2, wherein said nozzle is positionable at different heights on said pusher depending on the height of said glass article.

5. An apparatus according to claim 1, wherein the compressed air is blown at an angle downwardly from said nozzle and outwardly away from said corner region.

6. An apparatus according to claim 2, wherein the compressed air is blown at an angle downwardly from said nozzle and outwardly away from said corner region.

7. An apparatus according to claim 1, wherein the compressed air can be blown from said nozzle in a direction at least approximately parallel to said base portion and away from said corner region.

8. An apparatus according to claim 2, wherein the compressed air can be blown from said nozzle in a direction at least approximately parallel to said base portion and away from said corner region.

9. An apparatus according to claim 1, wherein the compressed air can be blown from said nozzle away from said corner region in the direction of a cylindrical part of said glass article which has a maximum transverse dimension.

10. An apparatus according to claim 2, wherein the compressed air can be blown from said nozzle away from said corner region in the direction of a cylindrical part of said glass article which has a maximum transverse dimension.

11. An apparatus according to claim 5, wherein the compressed air can be blown from said nozzle away from said corner region in the direction of a cylindrical part of said glass article which has a maximum transverse dimension.

12. An apparatus according to claim 7, wherein the compressed air can be blown from said nozzle away from said corner region in the direction of a cylindrical part of said glass article which has a maximum transverse dimension.

13. An apparatus according to claim 1, wherein said glass article is in contact with said thrust finger while said glass article is being pushed.

14. An apparatus according to claim 7, wherein said glass article is in contact with said thrust finger while said glass article is being pushed.

15. An apparatus according to claim 9, wherein said glass article is in contact with said thrust finger while said glass article is being pushed.

16. An apparatus according to claim 1, wherein said base portion further comprises:
- a carrier rail having an upper contact surface and a lower contact surface;
- a supply channel formed in said carrier rail for carrying compressed air, said supply channel including an upper cross-passage extending between said supply channel and said upper contact surface and a lower cross-passage extending between said supply channel and said lower contact surface; and
- a coupling member having a connecting passage in fluid communication with said nozzle, said coupling member being positionable on said upper contact surface and connectable in a gas-tight manner with said upper cross-passage positioning said nozzle at a first desired height, or on said lower contact surface and connectable in a gas-tight manner with said lower cross-passage positioning said nozzle at a second desired height relatively lower than said first height, said coupling member placing said nozzle in fluid communication with one of said cross-passages and said supply channel and supplying compressed air to said nozzle.

17. An apparatus according to claim 7, wherein said base portion further comprises:
- a carrier rail having an upper contact surface and a lower contact surface;
- a supply channel formed in said carrier rail for carrying compressed air;
- an upper cross-passage extending between said supply channel and said upper contact surface;
- a lower cross-passage extending between said supply channel and said lower contact surface; and
- a coupling member having a connecting passage in fluid communication with said nozzle, said coupling member being positionable on said upper contact surface and connectable in a gas-tight manner with said upper cross-passage positioning said nozzle at a first desired height, or on said lower contact surface and connectable in a gas-tight manner with said lower cross-passage positioning said nozzle at a second desired height relatively lower than said first height, said coupling member placing said nozzle in fluid communication with one of said cross-passages and said supply channel and supplying compressed air to said nozzle.

18. An apparatus according to claim 16, wherein said thrust finger is mounted on said coupling member.

19. An apparatus according to claim 17, wherein said thrust finger is mounted on said coupling member.

20. An apparatus according to claim 16, wherein the position of said coupling member can be adjusted lengthwise along said carrier rail.

21. An apparatus according to claim 18, wherein the position of said coupling member can be adjusted lengthwise along said carrier rail.

22. An apparatus according to claim 5, wherein the compressed air can be blown from said nozzle in a direction away from said corner region and at least approximately parallel to said base portion.

23. An apparatus for pushing at least one hollow glass article from a dead plate of a glass forming machine along a curved path onto a conveyor, said apparatus comprising:
- a pusher having a base portion and at least one thrust finger extending transversely relative to said base portion, said base portion and said thrust finger defining a pocket having a corner region to receive said glass article; and
- a nozzle positioned in said corner region of said pocket and oriented to direct compressed air outwardly from said corner region between said glass article and said base portion thereby creating a region of low pressure between said glass article and said base portion to draw said glass article into said pocket.

24. An apparatus according to claim 23, wherein said nozzle is mounted on said base portion.

25. An apparatus according to claim 24, wherein said nozzle is positionable at different heights on said base portion.

26. An apparatus according to claim 23, wherein the compressed air is directed at an angle downwardly and outwardly from said corner region.

27. An apparatus according to claim 23, wherein the compressed air is directed approximately parallel to said base portion and outwardly from said corner region.

28. An apparatus according to claim 23, wherein the compressed air is directed from said nozzle outwardly from said corner region in the direction of a cylindrical part of said glass article.

* * * * *